United States Patent [19]

Speaks

[11] Patent Number: 5,896,453
[45] Date of Patent: Apr. 20, 1999

US005896453A

[54] CIRCUITRY PROTECTION DEVICE

[75] Inventor: Elise P. Speaks, Apex, N.C.

[73] Assignee: Ericsson, Inc., Research Triangle Park, N.C.

[21] Appl. No.: 08/847,397

[22] Filed: Apr. 24, 1997

[51] Int. Cl.[6] .................................................... H04M 1/00
[52] U.S. Cl. ................................................ 379/433; 379/434
[58] Field of Search ............................... 379/433, 428, 379/434, 368, 451; 455/90, 575, 128; 400/479, 719

[56] References Cited

U.S. PATENT DOCUMENTS 5,180,237  1/1993  Chen .......................................... 400/479

FOREIGN PATENT DOCUMENTS 6-268548  9/1994  Japan .......................................... 379/433

OTHER PUBLICATIONS

Advertisement for Nokia Products Corp., Melbourne, Florida, Apr. 1997.

*Primary Examiner*—Jack Chiang
*Attorney, Agent, or Firm*—Jenkens & Gilchrist, P.C.

[57] ABSTRACT

An electronic circuitry protection device is disclosed. The device comprises a flexible, plastic, water-proof enclosure formed to envelop the electronic circuitry of a portable or hand-held cellular telephone. The protected circuitry is mounted within the telephone housing itself, and the design of the enclosure accommodates the fasteners used for mounting and connections to external devices without compromising its protective ability.

22 Claims, 4 Drawing Sheets

CIRCUITRY PROTECTION DEVICE

BACKGROUND OF THE INVENTION

1. Technical Field of the Invention

The present invention is directed to a device for the protection of electronic circuitry, and specifically to the protection of the internal circuitry of a portable or hand-held telephone from water damage.

2. Description of Related Art

Portable cellular phones are becoming increasing popular. As advances in cellular technology make their use easier and more affordable, cellular users avail themselves of their portable telephones for both business and personal use in a variety of environments. Some of these environments present conditions that may inadvertently result in damage to electronic equipment.

In particular, the portability of cellular phones has led to increased use near open water such as swimming pools, lakes, and rivers. Since the telephones are often used out-of-doors, calls are commonly made and received in the vicinity of fountains, tanks, and even large puddles. The hand-held units are often self-contained and not attached to the user or some larger fixture in any way. If dropped or tossed, the telephone could easily come into contact with the water, which may quickly incapacitate or damage the internal electronic circuitry. Similar damage could result from spilled or running liquids, such as beverages on a conference table, or from rainfall.

Existing protection for cellular telephones from water damage includes the use of water-tight carrying cases. These are often quite effective, but the phone must be removed from the carrying case for use; and such protection requires that the user anticipate the possible encounter with a water hazard and have the case available and employed. In addition, the seam between the two halves of the telephone housing can be sealed, but this method can be expensive, aesthetically undesirable, and only partially effective. Strategically placing gaskets or cloths in certain areas, such as the telephone's microphone opening, provide a barrier at that point, but not overall protection. The need exists for a form of electronic circuitry protection that protects substantially all of the internal circuitry, protects while the telephone is in use, requires no affirmative action by the user in order to be employed, and can be efficiently incorporated into the telephone's construction.

The invention of the present disclosure provides just such passive and continuous protection in a manner that does not add unduly to the cost of the unit and allows for easy replacement of the protective elements, if necessary.

SUMMARY OF THE INVENTION

The present invention is directed to a protective bag-like enclosure for telephone electronic circuitry, generally made of flexible plastic material, that in use is itself disposed inside the housing, or frame of the telephone. Ideally, little or no modification of the telephone housing is required in order to facilitate installation of the enclosure. The enclosure can be installed at the time of unit assembly or, with minor disassembly, incorporated into an existing phone. The enclosure can have any shape, but preferably has one open end or opening large enough to receive the circuity that during telephone assembly will be sealed either totally or around a connector. Openings in the enclosure for other electrical connections and for mounting fasteners are also sealed in such a way that invasion of water and other liquids through the openings is resisted or prevented. The design of the enclosure is such that the readability of visual displays and operability of the keypad is not materially affected. To prevent wear and to enhance water-resistance, portions of the enclosure are reinforced.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

Figure 1A:
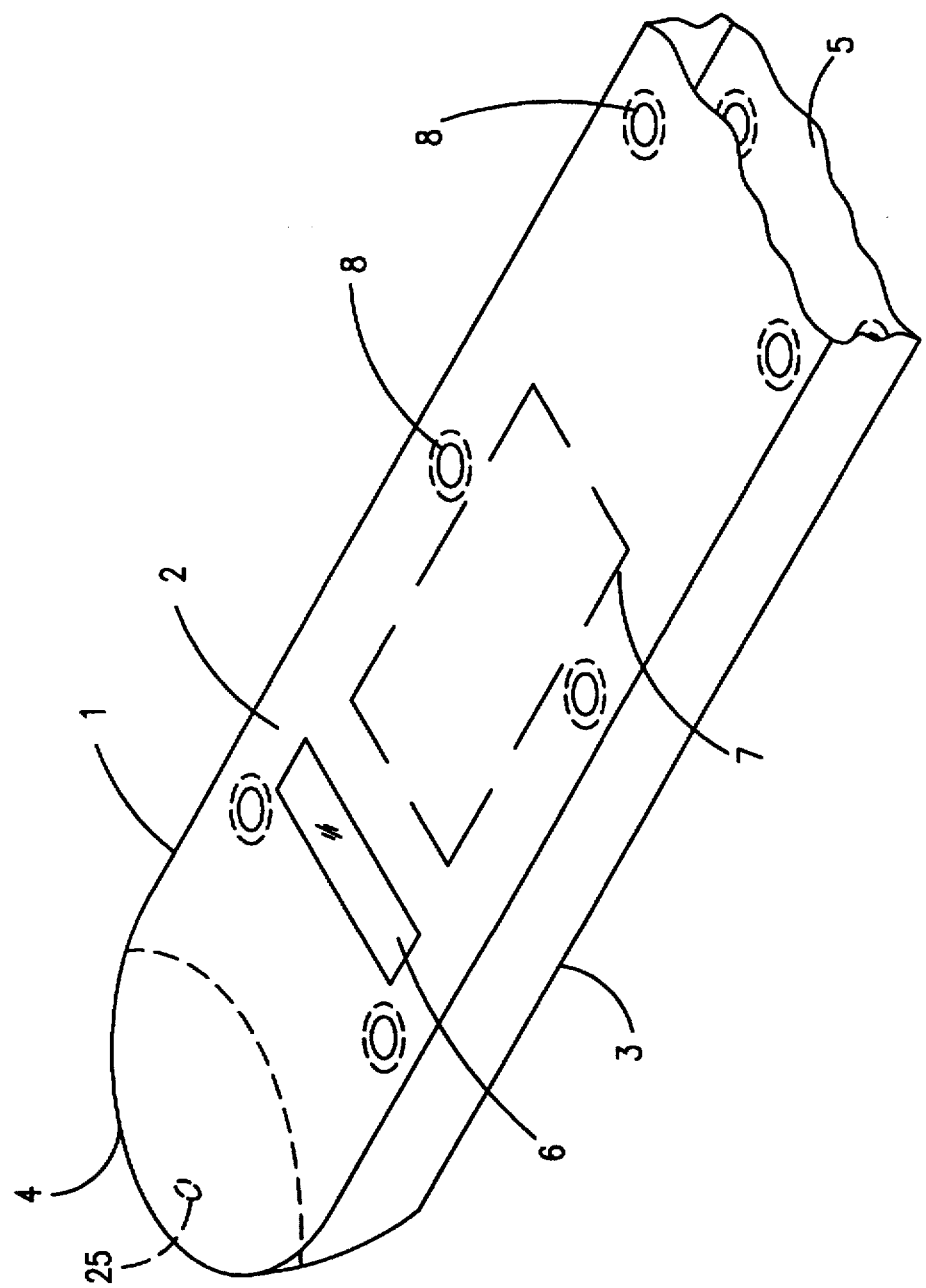
FIG. 1A is an illustration of an embodiment of the invention prior to installation.

FIG. 1A illustrates the enclosure 1 of the invention separate from the telephone. The enclosure 1 is large enough to envelop the telephone circuitry to be protected and small enough to permit the enveloped circuitry to be installed inside the telephone housing. Preferably, the enclosure 1 is a bag-like structure made of a flexible plastic waterproof material. The material may be thermally contractive, but should not be electrically conductive unless a non-conductive material can be inserted between the circuitry and the enclosure. In this disclosure, the terms "waterproof" and "water-resistant" are used interchangeably to connote a material through which water or other liquids may not pass easily, if at all. Although "water" is explicitly discussed, it is understood that the invention is intended to resist penetration by most liquids.

The optimum shape for the enclosure will depend on the design of the telephone in which it will be used and on manufacturing considerations. The preferred enclosure 1 comprises an integral top side 2, bottom side 3, closed end 4, and open end 5. Open end 5 permits the printed circuit board (not shown in FIG. 1A) to be easily inserted and positioned, after which enclosure 1 is sealed by any of a number of methods, some of which are discussed below. Top side 2 comprises an integral viewing portion 6 to provide an undistorted view of the telephone's liquid crystal display 12 (not shown in FIG. 1A). The material of viewing portion 6 is stiff enough to remain free from any wrinkles that might otherwise form in the relatively more flexible material of the enclosure 1. Top side 2 also comprises an integral reinforced portion 7 to be positioned beneath the telephone keypad 41 (not shown in FIG. 1A) to provide greater resistance to wear. Other portions of the enclosure may also be reinforced if desired, such as might be the case in the area proximate to an opening. Reinforced portions can be provided by adding material, or by locally varying the material's composition, for example by using additives to produce a relatively more wear-resistant section. Of course, if the enclosure's material is deemed sufficiently wear-resistant, reinforced portion 7 is unnecessary. When mounting fasteners are to be used, the preferred enclosure 1 is provided with a plurality of fastener openings 8, as more fully described below in relation to FIGS. 3A, 3B and 3C. Alternatively, the fastener openings 8 are created when the fastener is installed, in which case it is preferred that enclosure 1 be reinforced in the potential opening area or areas. Antenna opening 25 in closed end 4 accommodates the installation of an external antenna.

Figure 1B:
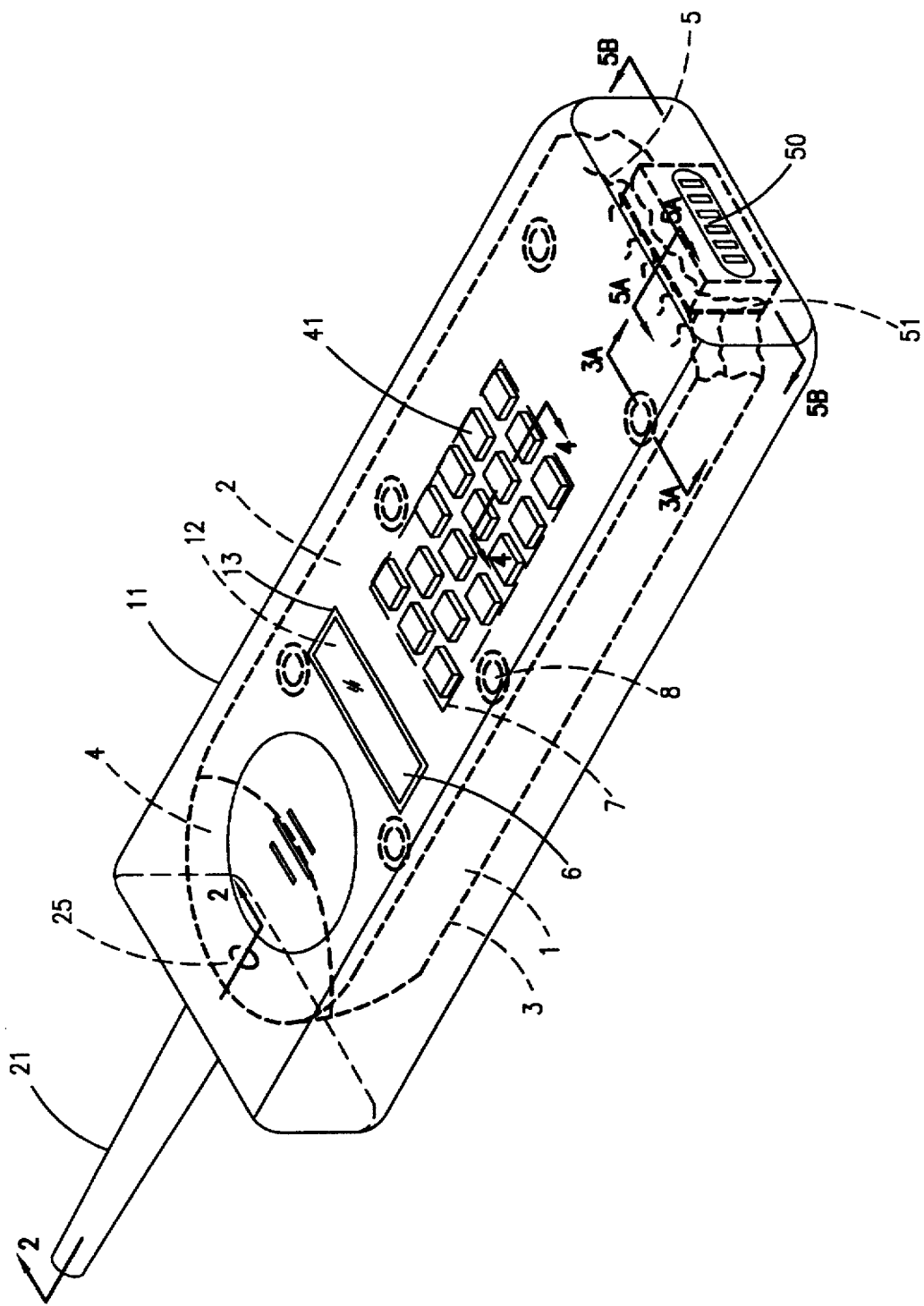
FIG. 1B is an illustration of an embodiment of the invention positioned in a cellular telephone.
Figure 2:
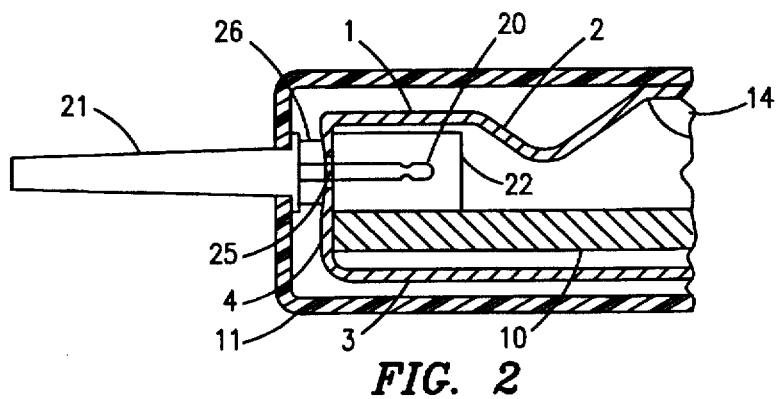
FIG. 2 is a detailed cross-sectional view of the cellular telephone body taken along lines 2—2 of FIG. 1B and illustrating the preferred connection of the antenna to the protected electronic circuitry.

FIG. 1B illustrates the positioning of the enclosure 1 inside the housing 11 of a conventional cellular telephone. Although a cellular telephone is depicted, the present invention can be used in any type of hand-held, portable phone, such as one in communication with the base station of a conventional home-telephone system. Opening 25 in closed end 4 is aligned with antenna body 21 so that the antenna can be connected to a connector on the printed circuit board 10 (as illustrated in FIG. 2). Viewing portion 6 is aligned with a display window 13 of housing 11 so that the user can view the telephone's LCD display 12, which lies inside enclosure 1.

Reinforced portion 7 is positioned under keypad 41. Open end 5 is shown closed about system connector 50 by band 51.

Referring to FIG. 2, the closed end 4 of enclosure 1 has an opening 25 just large enough for insertion therethrough of the telephone antenna lead 20. When assembled, this opening aligns with the antenna connector 22 of the printed circuit board 10 so that an antenna may be installed. The opening 25 is preferably smaller in diameter than the antenna body 21 so that when it is seated properly the closed end 4 of enclosure 1 is sealed against antenna connector 22 and intrusion by liquids though the opening 25 is inhibited. Further protection against liquid penetration through opening 25 can be obtained by installing a gasket 26 between the antenna body 21 and the closed end 4 of the enclosure 1. To help ensure proper positioning, the gasket could be attached to either antenna body 21 or closed end 4 using a suitable adhesive. In locations where separate gaskets, such as gasket 26, are used, they can be conventional O-ring gaskets, washers or suitably-formed pieces of gasket material placed on or adhered to the enclosure 1 at the location where the opening is to be formed. Alternatively, reinforcing closed end 4 of the enclosure 1 at the periphery of opening 25 will provide additional protection against liquid penetration, either alone or in combination with gasket 26. FIG. 2 also shows top side 2 of enclosure 1 positioned between housing 11 and telephone speaker 14.

Figure 3A:
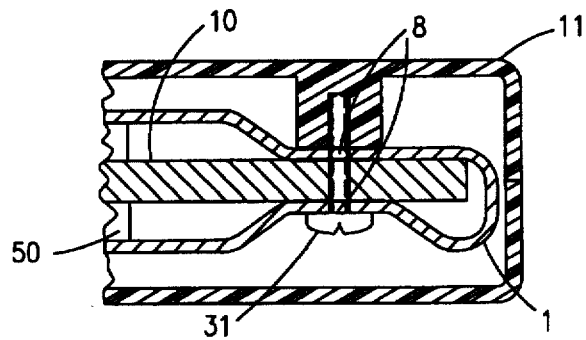
FIG. 3A is a detailed cross-sectional view of the cellular phone and enclosed printed circuit board at a mounting screw taken along lines 3A—3A of FIG. 1B.
Figure 3B:
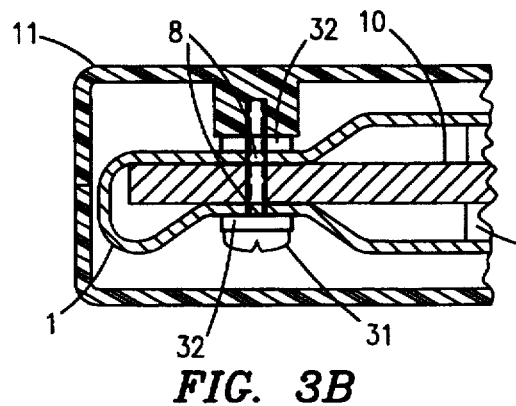
FIG. 3B is a detailed cross-sectional view similar to FIG. 3A, but showing the use of gaskets for sealing a mounting fastener opening.

Turning to FIGS. 3A and 3B, one or more mounting screws 31 or other suitable fasteners may be used to secure the printed circuit board 10 within the telephone housing 11, or to hold together sections of the telephone housing, or to do both. To avoid leakage when mounting fasteners are used, fastener openings 8 are preferably pre-formed in enclosure 1. In this embodiment, two fastener openings 8 are aligned with each other and with an opening in the printed circuit board 10, which is being held in place by a mounting screw 31. Generally, it is expected that the head of screw 31 on one side and the telephone housing 11 on the other will seal the fastener openings 8 and resist leakage. For further protection, however, mounting screw gaskets 32 may be used, as shown in FIG. 3B, or the periphery of the fastener openings 8 may be reinforced, or both.

Figure 3C:
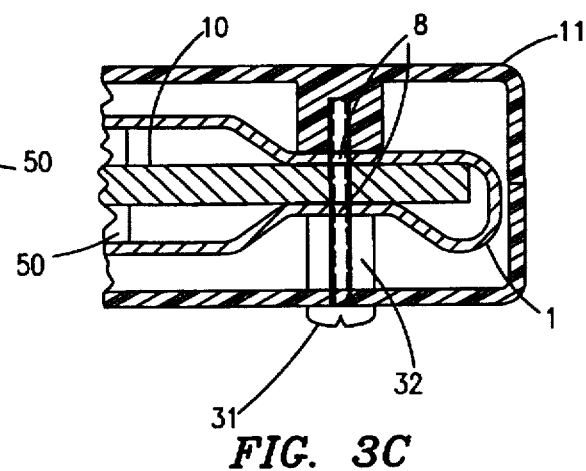
FIG. 3C is a detailed cross-sectional view similar to FIGS. 3A and 3B, but showing the use of a gasket in conjunction with a conductive mounting screw.

FIG. 3C shows yet another mounting fastener configuration. In the embodiment of FIG. 3C, mounting screw 31 protrudes through telephone housing 11 to act as a conductor between an external battery (not shown) and a conductor (not shown) of the printed circuit board 10. In this embodiment, one fastener opening 8 is sealed by mounting screw gasket 32 pressing enclosure 1 against printed circuit board 10. Alternately, a second gasket could be used, or the openings 8 could both be closed by appropriately formed portions of housing 11. Whenever portions of the housing 11 are employed to seal an opening, the portions of housing 11 that contact the enclosure 1 may be treated, coated, or covered with a resilient or adhesive material to enhance water-resistance.

Figure 4:
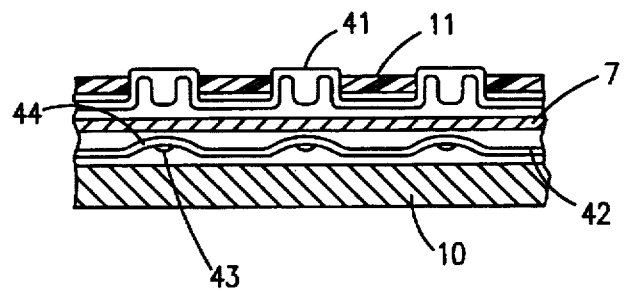
FIG. 4 is a detailed cross-sectional view taken along lines 4—4 of FIG. 1B at the keypad interface.

Turning to FIG. 4, keypad 41 is disposed outside reinforced portion 7 of enclosure 1. A polydome 42 is positioned on the printed circuit board 10 directly below keypad 41 and inside enclosure 1. Each individual dome switch 44 of polydome 42 is aligned with a key of keypad 41 and has underneath it a conductive pill 43 that corresponds to a switch (not shown) on printed circuit board 10. The switch is therefore operated whenever the corresponding switch dome 44 is depressed and released. Downward force on the key is easily transmitted to the dome switch 44 through the reinforced portion 7 of enclosure 1.

Figure 5A:
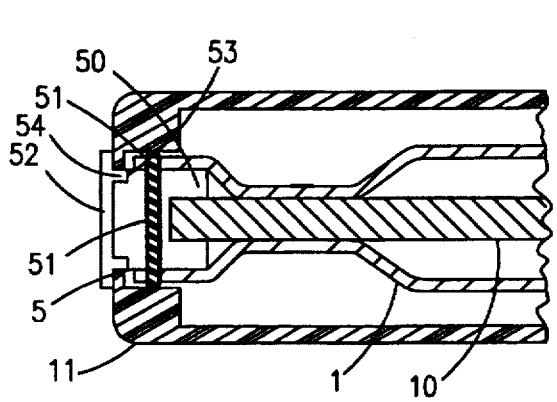
FIG. 5A is a detailed cross-sectional view of the cellular phone taken along lines 5A—5A of FIG. 1B illustrating the closing of the enclosure about a system connector.

FIG. 5A provides a cross-sectional view illustrating an embodiment with open end 5 of enclosure 1 closed against the system connector 50 by system connector band 51. Band 51 is preferably made of elastic material, but can also take the form of a non-elastic tie, cord, clamp, or equivalent structure. Preferably, for any existing telephone design it is possible to fabricate an appropriately-sized system connector band 51 that will of itself provide water-resistant closure. Some modification of the shape of the system connector 50, printed circuit board 10, or housing 11, however, may be necessary, or at least helpful to providing or enhancing water-resistance. Alternative methods of closing open end 5 may also be used. Depending on the telephone's design, it may be preferable to close open end 5 around the printed circuit board 10 itself, or some other component, or to provide an intermediate seating surface against which to close open end 5 of enclosure 1.

Open end 5 can also be adhesively attached to the printed circuit board 10 or the system connector 50. If no system connector is used, the enclosure 1 can simply be closed and heat-sealed. An adhesive seal could also be employed, as could a mechanical one, for example, using a tie, clamp or appropriately formed portions of the housing 11 to seal the enclosure 1 shut.

It will also be recognized that any suitable shape for the enclosure 1 may be used, and that instead of providing an open end 5, any opening of sufficient size will enable the printed circuit board 10 to be placed inside the enclosure.

Alternatively, enclosure 1 could be formed with the printed circuit board 10 inside it and any openings or open sides closed or sealed appropriately. For added protection or convenience, any of the methods described above can also be used in combination with each other.

Also shown in FIG. 5A is the use of a system connector plug 52, which can be inserted to provide further protection against penetration by liquid when the system connector is not in use. Preferably, the system connector forms a groove 53 into which a matching protrusion 54 on plug 52 can be installed. The plug 52 of FIG. 5A is shown as a separate component, but it could also be connected to the telephone housing 11 by a hinge, cord, or similar device.

Figure 5B:
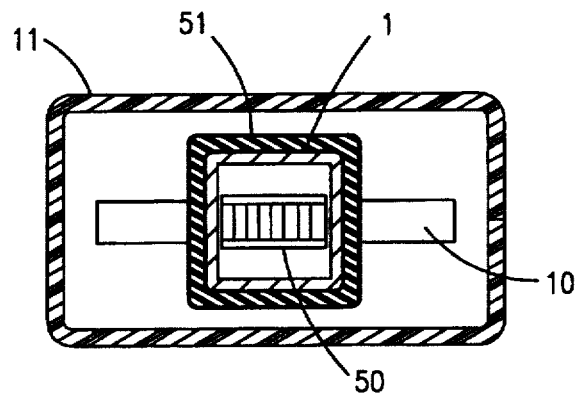
FIG. 5B is a detailed cross-sectional view taken from the system connection end of the cellular phone taken along lines 5B—5B of FIG. 1B and illustrating the closing of the enclosure about a system connector.

FIG. 5B provides an end view of the embodiment shown in FIG. 5A. In this embodiment, portions of housing 11 are formed so as to secure band 51 in place when the telephone is assembled.

Figure 5C:
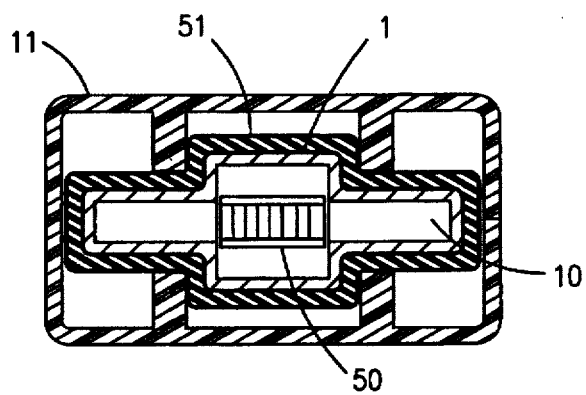
FIG. 5C is a detailed cross-sectional view similar to FIG. 5B, but showing an alternative embodiment in which the enclosure is closed about both the system connector and the printed circuit board.

FIG. 5C illustrates an alternative cooperation between the printed circuit board 10, the system connector 50, the system connector band 51 and the telephone housing 11 to effectively close open end 5 of enclosure 1, as viewed cross-sectionally from the end of the telephone. In this embodiment, the effectiveness of the seal is enhanced by pressure from appropriately formed portions of the assembled telephone housing 11.

The previous description is of a preferred embodiment for implementing the scope of the invention and should not necessarily be limited by this description. The scope of the present invention is instead defined by the following claims.

What is claimed is:

1. An electronic circuitry protection device for use in portable and cellular telephones, the telephone having a housing containing telephone circuitry, comprising:

a replaceable, flexible water-resistant bag separate and apart from the telephone housing for enveloping the telephone circuitry, wherein said bag is to be substantially contained within the telephone housing.

2. The electronic circuitry protection device of claim 1, wherein said bag includes at least one opening to permit electrical connection between the telephone circuitry and apparatus outside the bag; and further comprising:

means for substantially securing said at least one opening to resist penetration therethrough by liquid.

3. The electronic circuitry protection device of claim 2, wherein said means for substantially securing said at least one opening is a band.

4. The electronic circuitry protection device of claim 2, wherein said means for substantially securing said opening is an adhesive bond.

5. The electronic circuitry protection device of claim 2, wherein said means for substantially securing said opening is a thermally created bond.

6. The electronic circuitry protection device of claim 1, further comprising:

a transparent viewing portion of stiff material integrally formed with said bag and through which a display associated with the telephone circuitry may be viewed.

7. The electronic circuitry protection device of claim 1, wherein said bag has at least one reinforced portion to enhance wear-resistance.

8. The electronic circuitry protection device of claim 1, wherein said bag includes at least one fastener opening for insertion therethrough of a mounting fastener used in securing the telephone circuitry within the telephone housing.

9. The electronic circuitry protection device of claim 8, wherein said at least one fastener opening is reinforced at its periphery.

10. The electronic circuitry protection device of claim 8, further comprising:

gasket means for inhibiting leakage through said at least one fastener opening.

11. A circuitry protection device for a hand-held portable or cellular telephone that includes telephone circuitry within a housing, comprising:

a replaceable, flexible plastic bag separate and apart from the housing having an opening for an electrical connector for enveloping the protected circuitry;

a means for securing said opening so as to resist the introduction of liquids therethrough;

wherein said bag is constructed for installation inside the housing and further comprises a stiff viewing portion integrally formed with said bag through which a visual display of the telephone may be viewed; and wherein said bag further comprises an integrally-formed reinforced portion for positioning below a keypad of the telephone and resisting wear associated with keypad use.

12. The circuitry protection device of claim 11, wherein said bag further comprises at least one fastener opening therein for insertion therethrough of a mounting fastener.

13. The electronic circuitry protection device of claim 12, wherein said bag is reinforced at the periphery of said at least one fastener opening.

14. A water-resistant telephone comprising:

a telephone printed circuit board;

a replaceable, water-resistant bag for substantially enveloping said printed circuit board; and a telephone housing for substantially containing said printed circuit board and said bag, wherein said bag is separate and apart from said telephone housing.

15. The telephone of claim 14, further comprising:

a keypad for user interface; and a plurality of dome switches mounted inside said bag, each of said plurality of dome switches corresponding to a key of said keypad for operating a switch on said printed circuit board when a key on said keypad is depressed.

16. The telephone of claim 15, wherein said bag further comprises an integrally-formed reinforced portion disposed between said plurality of dome switches and said keypad.

17. The telephone of claim 14, further comprising a mounting fastener for mounting said printed circuit board, and wherein said bag further comprises at least one opening through which said mounting fastener is installed.

18. The telephone of claim 17, wherein said mounting fastener protrudes from said telephone housing for electrically connecting an external battery to a conductor on said printed circuit board.

19. The telephone of claim 14, wherein said bag further comprises:

at least one opening to permit electrical connection between the telephone printed circuit board and external apparatus; and further comprising:

means for substantially securing said at least one opening to resist penetration therethrough by liquid.

20. The telephone of claim 19, wherein said means for substantially securing said at least one opening is a band.

21. The telephone of claim 19, wherein said open end is further secured by portions of said telephone housing formed to hold said band in place.

22. The telephone of claim 19, further comprising:

a system connector for making electrical connections between the telephone printed circuit board and external apparatus; and a plug for covering the contacts of said system connector when not in use.

* * * * *